(12) United States Patent
Cook et al.

(10) Patent No.: US 11,415,413 B2
(45) Date of Patent: Aug. 16, 2022

(54) LEVEL WITH ATTACHMENT FEATURE

(71) Applicant: AMAX INCORPORATED, North Kingstown, RI (US)

(72) Inventors: Vincent Cook, Milford, CT (US); Joshua J. Boccanfuso, Hope Valley, RI (US)

(73) Assignee: AMAX INCORPORATED, North Kingstown, RI (US)

( * ) Notice: Subject to any disclaimer, the term of this patent is extended or adjusted under 35 U.S.C. 154(b) by 165 days.

(21) Appl. No.: 17/101,911

(22) Filed: Nov. 23, 2020

(65) Prior Publication Data

US 2021/0156686 A1 May 27, 2021

Related U.S. Application Data

(60) Provisional application No. 62/939,542, filed on Nov. 22, 2019, provisional application No. 62/938,831, filed on Nov. 21, 2019.

(51) Int. Cl.
| | |
|---|---|
| *G01C 9/26* | (2006.01) |
| *G01C 9/02* | (2006.01) |
| *G01C 9/34* | (2006.01) |

(52) U.S. Cl.
CPC .................. *G01C 9/02* (2013.01); *G01C 9/34* (2013.01)

(58) Field of Classification Search
CPC ............... G01C 9/02; G01C 9/34; G01C 9/26
USPC .......................................... 33/347, 372, 373
See application file for complete search history.

(56) References Cited

U.S. PATENT DOCUMENTS

| | | | | |
|---|---|---|---|---|
| 3,230,632 | A | | 1/1966 | Redding |
| 3,707,772 | A | * | 1/1973 | Cotter ...................... G01C 9/16 33/395 |
| 4,970,796 | A | | 11/1990 | Masters et al. |
| 5,088,205 | A | * | 2/1992 | Egbert ...................... G01C 9/02 33/371 |
| 5,207,004 | A | | 5/1993 | Gruetzmacher |
| 5,815,937 | A | * | 10/1998 | Glorioso, Jr. ............ G01C 9/28 33/372 |
| 6,029,359 | A | | 2/2000 | Szumer |
| 6,332,277 | B1 | * | 12/2001 | Owoc ...................... G01C 9/28 33/373 |
| 6,389,709 | B1 | * | 5/2002 | Lunde ...................... G01C 5/00 33/768 |
| 7,059,059 | B1 | * | 6/2006 | Ames ...................... G01C 9/28 33/372 |
| 7,111,409 | B2 | * | 9/2006 | Janssen .................. B26B 29/06 33/21.1 |

(Continued)

*Primary Examiner* — George B Bennett
(74) *Attorney, Agent, or Firm* — Paul Y. Feng; One LLP (57) ABSTRACT

A carpenter's, mason's, or plumber's level with an elastic, flexible cord for attachment to a plank, pipe, or workpiece is disclosed. The level has a linear, bar-shaped body with a rectangular cross-section, where portions of the body may be hollow or have recessed openings therein. The level has an elastic cord connected to the body, wherein the cord is stretch-wrapped around a plank, pipe or like workpiece to attach the level thereto for angular tilt measurement. A groove, a contour, a notch, a boss, a ridge, a hole, a recess, a hook, or the like can be used to hold or snare the elastic cord when in use and to store the elastic cord on the level body when not in use. The level body has an opening to receive a bubble vial for angular tilt indication.

20 Claims, 7 Drawing Sheets

(56) References Cited

U.S. PATENT DOCUMENTS

| | | | | |
|---|---|---|---|---|
| 7,240,437 | B1* | 7/2007 | Moldovan | B25H 7/005 |
| | | | | 33/529 |
| 7,520,066 | B2 | 4/2009 | Richins | |
| 7,562,462 | B2* | 7/2009 | Gentleman | G01C 9/28 |
| | | | | 33/372 |
| 7,644,506 | B2* | 1/2010 | Wong | G01C 9/28 |
| | | | | 33/373 |
| 8,402,667 | B2* | 3/2013 | Spaulding | G01C 9/26 |
| | | | | 33/372 |
| 9,733,077 | B2* | 8/2017 | Swisher | B44D 2/007 |
| 10,928,197 | B2* | 2/2021 | Wojciechowski | G01C 9/28 |
| 2003/0066198 | A1* | 4/2003 | Turner | G01C 9/28 |
| | | | | 33/370 |
| 2008/0222907 | A1* | 9/2008 | Silberberg | G01C 9/28 |
| | | | | 33/379 |
| 2011/0258869 | A1* | 10/2011 | Bittkowski | A61B 5/107 |
| | | | | 356/625 |
| 2021/0220893 | A1* | 7/2021 | Sullivan | B21D 7/16 |
| 2022/0113134 | A1* | 4/2022 | Chan | G01C 9/12 |

* cited by examiner

LEVEL WITH ATTACHMENT FEATURE

CROSS-REFERENCE TO RELATED APPLICATIONS

This non-provisional application claims benefit of priority from U.S. provisional application No. 62/938,831, filed on Nov. 21, 2019, and from U.S. provisional application No. 62/939,542, filed on Nov. 22, 2019, the contents of which are hereby incorporated by reference.

FIELD OF THE INVENTION

The present invention is generally directed to a level.

BACKGROUND

Figure 1:
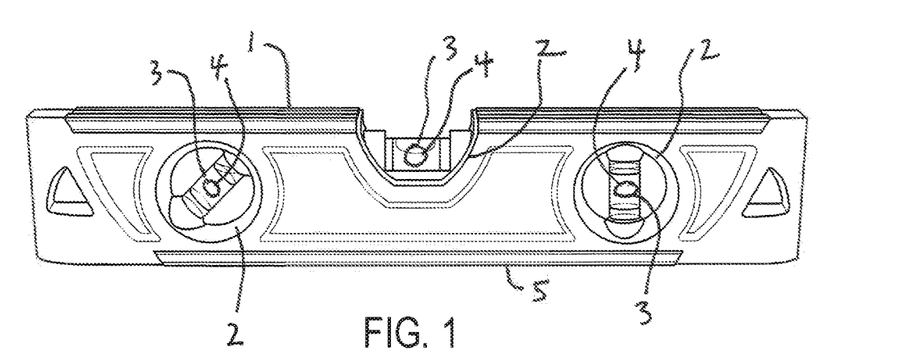
FIG. 1 depicts a conventional carpenter's level with three bubble vials for level measurement.

A typical level 1 is shown in FIG. 1. The level 1 has a bottom 5 to be laid upon a workpiece (not shown) for measuring the angular tilt of the workpiece relative to the ground. The level 1 is usually in the form of a bar with several openings 2 that hold spirit levels 3. The spirit levels 3 are transparent glass or plastic vials containing a viscous, color-pigmented fluid with an entrained bubble 4. Movement of the bubble 4 within the vial indicates the angular tilt, if any, of the workpiece in relation to the ground.

There have been attempts at attaching a level to a pipe or wood plank. For example, U.S. Pat. No. 5,207,004 (Gruetzmacher), discloses a post level having a 90-degree bend in the body where the inner void of the "L" receives the round outside diameter of the post. A rubber band wraps around the post to hold the level against the post. U.S. Pat. No. 6,029,359 (Szumer) discloses a similar L-shaped body level attachable to a round post or pipe. U.S. Pat. No. 4,970,796 (Masters) discloses a self-supporting spirit level where portions of the body have a prominent V or L shape for fitment against a pipe. One or more shock cords are used to hold the level against the pipe. Magnets may be used to hold the level to a metal pipe.

SUMMARY OF THE INVENTION

The present invention in a preferred embodiment is directed a level for use with or attachment to a workpiece, plank, pipe or the like by an elastic cord, rubber band, cable, strap or the like. This frees up the user's hands so there is no need to hold the level against the workpiece, because the cord performs this function. Furthermore, the workpiece may be shifted or moved with the level still attached to it before the workpiece is permanently nailed or fitted in place. The user can continually monitor the angular tilt of that workpiece during the installation process. The preferred embodiment includes structures to store the cord out of the way when not in use. Moreover, the elastic cord of the preferred embodiment level can be swapped out easily by the user for cords of a different elasticity, length, cross-sectional size or shape, stiffness, and material to accommodate workpieces of different girths, sizes, and cross-sectional shapes.

In one preferred embodiment, the level has a linear bar-shaped body having an elongated length, a height, and a narrow width, the body further having a first end, a second end, and a flat bottom measurement surface. The body preferably has a rectangular cross-section, where portions of the body may be hollow or have recessed openings therein. One or more cord retention means are formed from one or more portions of the body. It is preferably located at or formed from one or both ends of the body, proximate the bottom surface, or any combination thereof, or elsewhere on the body. The cord retention means may be a groove, a contour, a notch, a boss, a ridge, a hole, a recess, a hook, or the like, to snare or hold the stretched cord when in use, or to store the cord on the body and out of the way when not in use. The body may further include one or more open recesses for storing the cord when not in use.

The body has an opening to receive a level sensing means. Preferably, the level sensing means includes a bubble entrained in liquid held inside a transparent vial used for level measurement. There may be several bubble vials disposed around the body at differing inclines for angular tilt measurement and indication.

Because the cord is flexible and stretchable, it can be wrapped around and accommodate planks, pipes and workpieces of varying shapes, diameters, and girths. This is much superior to a conventional rigid, spring clamp where the fixed dimension jaws can only accommodate a limited number of shapes and sizes of workpieces inside those jaws.

The cord is preferably an elastic bungee cord, a rubber band, an elastic strap, or the like. It is preferably a single strand with one or more knots at one or both ends for attachment to the body. The cord is conveniently wrapped to the level and stored out of the way, optionally, in an open recess in the body when not in use.

BRIEF DESCRIPTION OF THE DRAWINGS

FIGS. 10a-d depict how to attach the alternative embodiment level to a horizontal plank. Detailed features of the level are omitted from these drawings for the sake of clarity.

DETAILED DESCRIPTION OF THE PREFERRED EMBODIMENTS

The present invention in various preferred embodiments contemplates a measurement level with a means for attaching the level to a workpiece such as a rectangular plank or 2×4, a round pipe, building construction framing, or like workpieces. The present invention measurement level may be implemented in a carpenter's level, a mason's level, a torpedo level, a plumber's level, or the like.

FIG. 1 shows a preferred embodiment measurement level 10. The level 10 has a linear, bar-shaped body 12. The body 12 has a first and second ends 14, 16. Within the body are openings 18 and disposed within each opening is a level sensing means 20, which in a preferred embodiment is a transparent glass or plastic vial containing a color-pigmented viscous fluid with an entrained bubble. The vials may have a protective cover to protect the glass or plastic. Movement of the bubble within the vial indicates the angular tilt of the level and associated workpiece. Other level sensing means are contemplated, such as a digital accelerometer or strain gauge with an LED display of angular tilt; a simple weight balanced on a hinge with an arrow indicating angular tilt similar to a magnetic compass; an electronic inclinometer; a weighted, floating ball inside a fluid similar to an attitude indicator in an airplane instrument panel; or the like.

The body 12 preferably includes a flat bottom surface 22 that extends the length of the body 12. The body 12 preferably has a rectangular cross-section with a narrow width, a height, and an elongated, straight length, but other cross-sectional shapes are contemplated including an oval, a square, a triangle, or any polygon. The body 12 is elongated and straight and does not have any bends, curves, or angles from one end to the other; the elongated, linear body 12 ensures that when the level 10 is placed on a pipe or plank that the level measurement is accurate and does not incorrectly reflect local warpage in the surface of the plank or pipe. The bottom surface 22 is flat and smooth to rest flush against the flat surface of the plank, pipe, or workpiece, again for the sake of accurate measurement.

Figure 2:
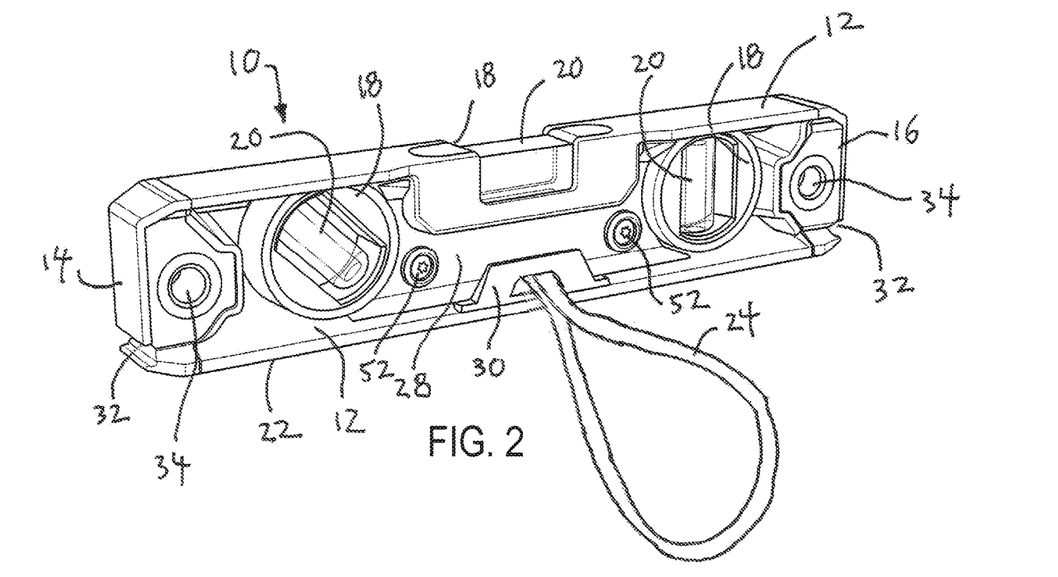
FIG. 2 shows a preferred embodiment attachable measurement level.
Figures 5A, 5B, 6:
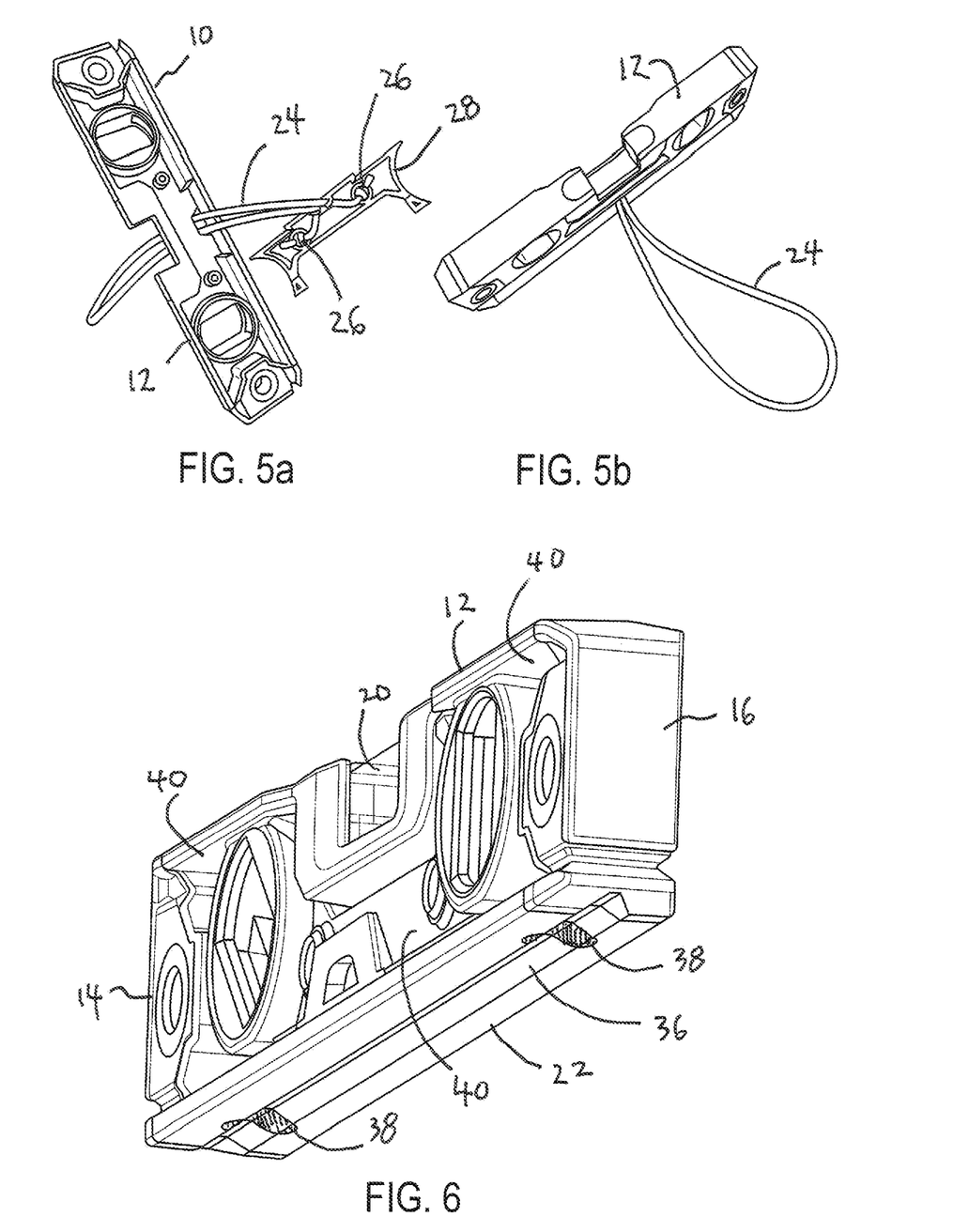
FIG. 5a shows how an elastic cord is anchored to the body using a user removable plate.
FIG. 5b shows the plate assembled to the body with the cord loop ready for use.
FIG. 6 is an end perspective view showing the bottom surface with an optional V-notch.

A stretchable, flexible elastic cord 24 extends from the body 12. This cord 24 is stretched and wraps around the plank, pipe, or workpiece for attachment thereto. It is preferably a bungee cord, a rubber band, an elastic strap, or the like. It is formed into a loop as shown in FIG. 2, but can be used in the form of a single strand. As seen in FIG. 5a, one or both free ends of the cord 24 may have a knot 26. The cord 24 may pass entirely through the body 12 from one side to the other.

Figure 3:
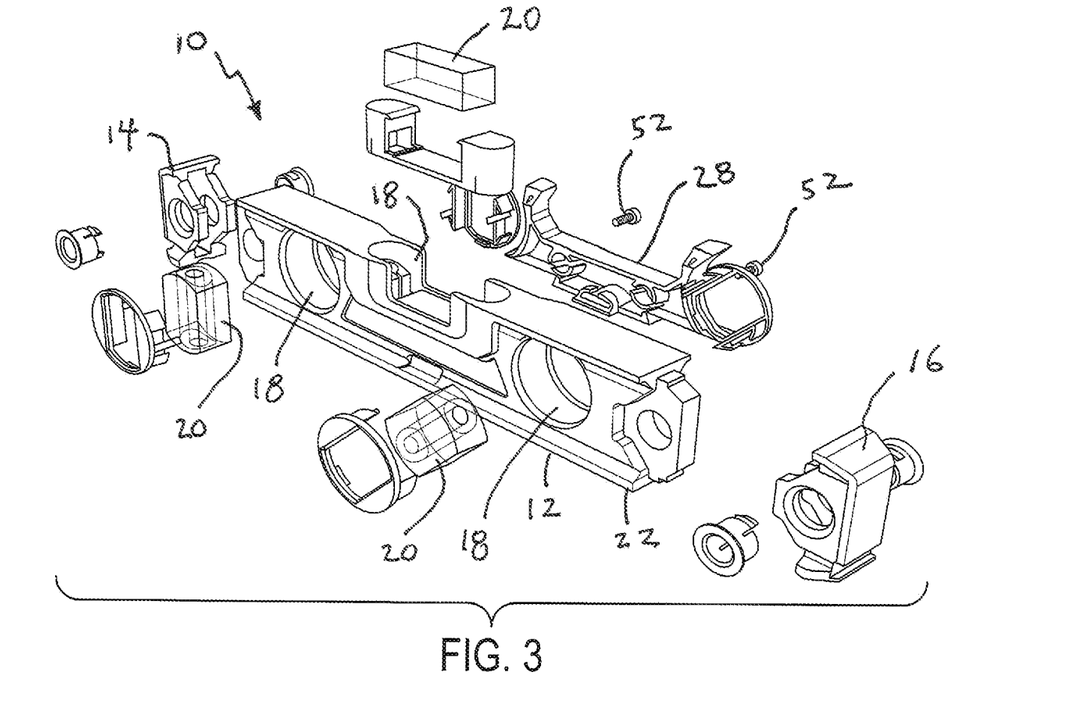
FIG. 3 is an exploded view of a preferred embodiment attachable measurement level.
Figure 4A:
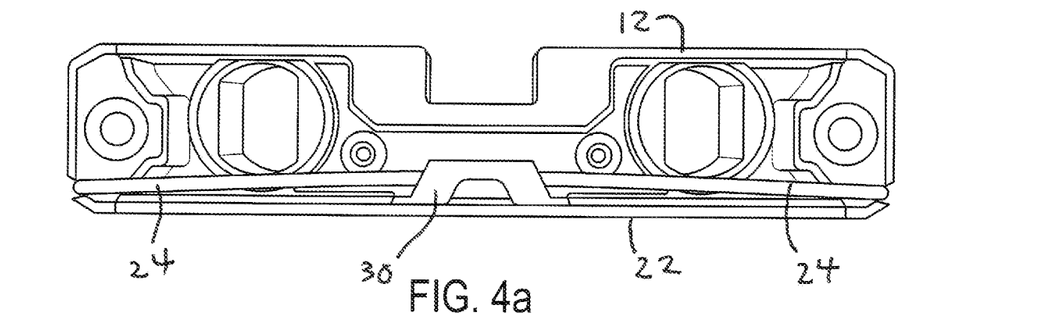
FIGS. 4a and 4b are front and back views of the preferred embodiment level, where the bubble vials have been omitted.
Figure 4B:
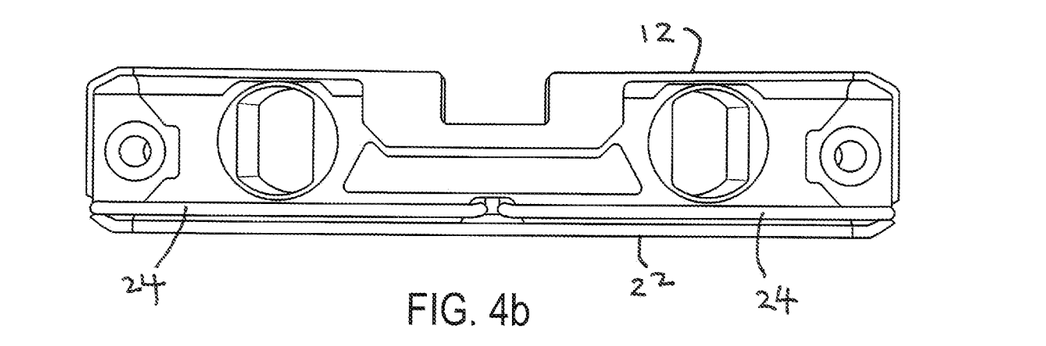

As seen in FIGS. 2, 3, and 5a, the knot 26 is tied to a removable plate 28 that is assembled to the body using screws 52, fasteners, snaps, or the like. This removable plate 28 is user accessible so if the cord 24 becomes damaged, loses its elasticity, or is broken after years of use, the cord 24 can be replaced by the user by removing the plate 28 from the body 12, untying the knots 26 and separating the old cord from the plate 28. A new cord can then be attached to the plate 28, the plate reattached to the body, FIG. 5b, and the level 10 is ready for use again. The user can further customize the level 10 by replacing the cord with his own selection that has a material, diameter, thickness, length, rigidity, and elasticity appropriate to his application. The user can purchase a replacement elastic cord from a local big box home supercenter, cut the cord to length as needed, and attach to the level as described above.

In an alternative embodiment, there may be more than one cord attached to various parts of the body at different locations, such as one cord at each end to accommodate a variety of construction site or builder needs. The length of the cord can be field adjusted by the user by double wrapping around the workpiece, or tying off a knot to shorten its length for smaller dimensioned planks or pipes, for example.

FIG. 2 shows a hook 30 extending from the body 12. When the user stretches and wraps the cord 24 around the plank, pipe or workpiece, the loop of the stretched cord 24 is snared by a cord retention means, here the hook 30, for holding the level to the plank, pipe or workpiece. In various alternative embodiments, there may be more than one cord retention means at different locations and orientations relative to the body. The cord retention means may be used to hold the stretched cord during use; such cord retention means may take the form of a groove, a contour, a notch, a boss, a ridge, a hole, an eyelet, a recess, or the like where the stretched cord may be tied, hooked, snared or tethered thereto.

FIG. 2 depicts another cord retention means used for cord storage in the form of, for example, a groove 32 at each end 14, 16. The groove 32 receives the stretched cord 24 and holds the cord to the body 12 out of the way when not being used. The cord retention means may further include the hook 30, or eyelets 34 that the cord 24 can pass through and tied to the body by the user. Thus, in various alternative embodiments, the cord retention means may be a groove, a contour, a notch, a boss, a ridge, a hole, a recess, a hook, or the like, in any combination, to stow the cord in place when not in use, or to snare the cord when it is being used, or both.

In the preferred embodiment, the main body 12 is a painted die cast aluminum. As seen in FIG. 3, the endcaps that fit into the ends 14, 16 of the body are molded, flexible thermoplastic. The endcaps are locked in place using molded ABS lock pins. Hooks 30, openings 34 or tethers are molded ABS. Spirit vial covers are molded ABS, while the vials are cast acrylic. The cord 24 in the exemplary embodiment is a bungee style bundled elastic band(s) with a flexible woven outer fabric sleeve. Alternatively, the main body can be a molded plastic, die cast aluminum or similar alternative metal suitable for die casting, or fashioned from extruded aluminum.

FIG. 6 is a perspective view of the preferred embodiment level 10 where the cord 24 has been omitted for clarity of illustration. The flat bottom surface 22 optionally includes a V-notch 36. The V-notch 36 is used for sight alignment of the level 10 on the centerline of a round pipe. The V-notch 36 also enables the level 10 to receive the sharp 90-degree corner of a wood plank or like workpiece if the user should desire to attach the level in such a manner. Optional magnets 38 may be fitted at the bottom surface 22 for attachment to a cast iron or ferromagnetic metal pipe, for example.

The body 12 may optionally include hollow portions or open recesses 40 as seen in FIG. 6. These open recesses or hollow portions 40 may receive the cord 24 therein for storage when not in use. The open recesses 40 further simplify manufacturing/casting processes for the level and reduce material costs.

Figure 7A:
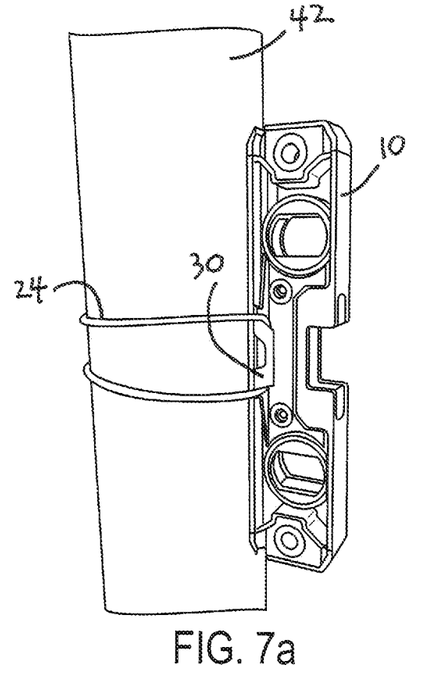
FIG. 7a shows the measurement level attached to a vertical plastic pipe using the elastic cord to wrap around the pipe.
Figure 7B:
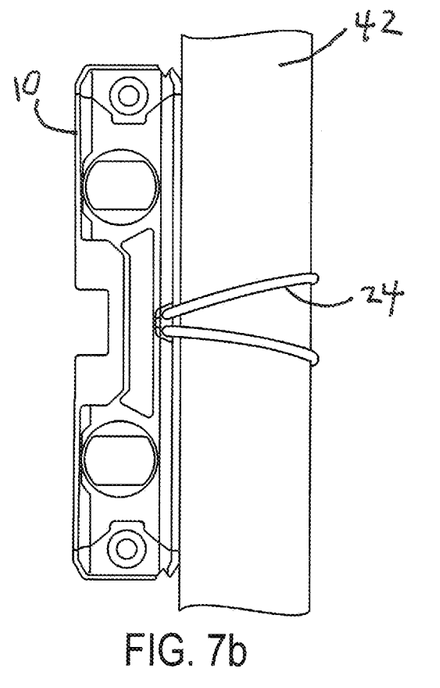
FIG. 7b is a backside view of the level again attached to a pipe using the cord.

FIG. 7a shows the measurement level 10 attached to a vertical, round plastic pipe 42 using the elastic cord 24 to stretch-wrap around the pipe. The cord 24 is snared by the hook 30 to hold everything in place. FIG. 7b is a backside view of the level 10 again attached to a pipe 42 using the cord 24.

Figure 7C:
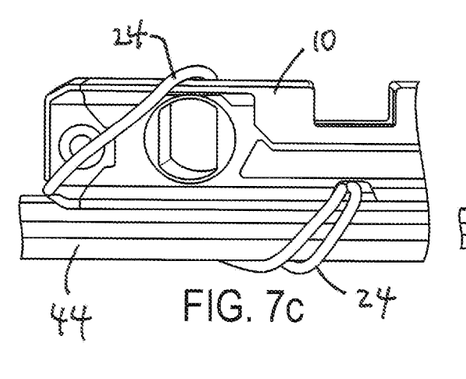
FIG. 7c shows the measurement level attached to a horizontal plank at one end with the elastic cord.
Figure 7D:
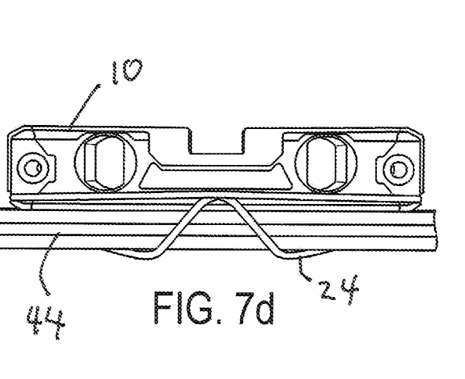
FIG. 7d shows the measurement level attached to a horizontal plank with the elastic cord wrapped at a midpoint of the level body.

FIG. 7c shows the measurement level 10 attached to a horizontal plank 44 at one end with the elastic cord 24. FIG. 7d shows the measurement level 10 attached to a horizontal plank 44 with the elastic cord 24 wrapped at a midpoint of the level body. The spirit levels have been omitted from these FIG. 7 drawings for the sake of clarity.

Figure 8:
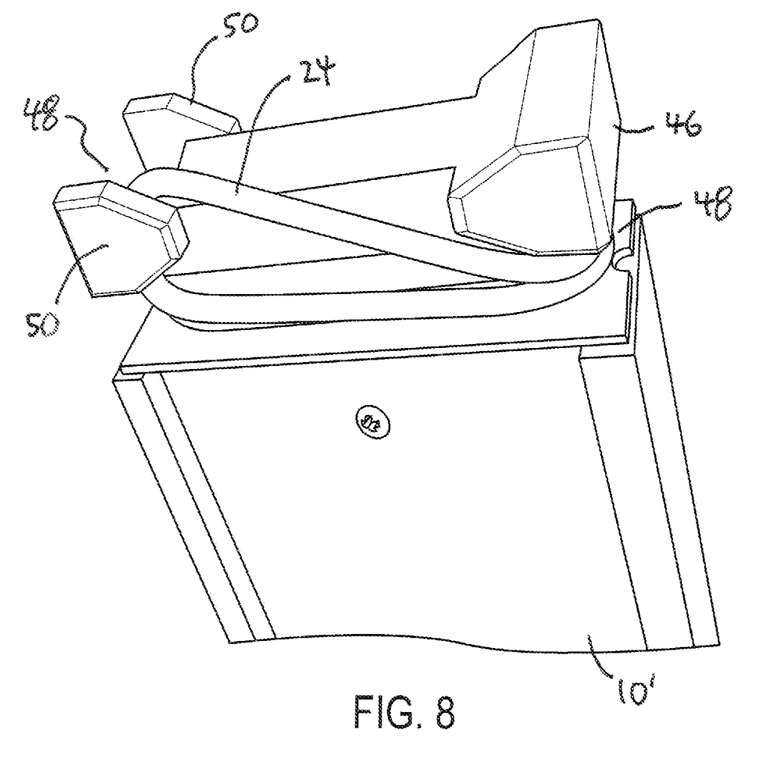
FIG. 8 is an alternative embodiment level where the contoured shape of one end is used to store the elastic cord.

FIG. 8 illustrates an alternative embodiment level 10' having a cord retention means disposed at or formed into one or both ends. In FIG. 8, one end or endcap 46 includes a contoured shape capable of receiving the elastic cord 24 wrapped thereon. The contoured shape serves as a cord retention means for storage or to snare the cord when it is wrapped around a workpiece. The contoured shape endcap 46 incorporates grooves 48 and hooks 50 that help wrap and retain the cord 24 thereto.

Figure 9A:
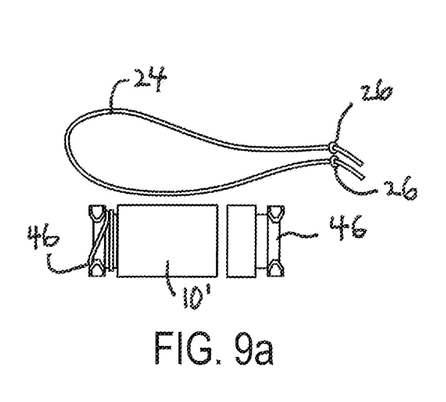
FIG. 9a is an alternative embodiment showing a level where both ends include contoured shapes for holding the elastic cord. Detailed features of the level are omitted from FIG. 9 drawings for the sake of clarity.

FIG. 9a shows the alternative embodiment level 10' where both ends or endcaps 46 include contoured shapes for holding the elastic cord 24 during storage or attachment to a workpiece. The level body may have a hollow portion to receive the endcap 46 therein. Detailed features of the level 10' are omitted from FIG. 9 drawings for the sake of clarity. In an alternative embodiment, there may be one or more cords for each endcap 46.

Figures 9B, 9C:
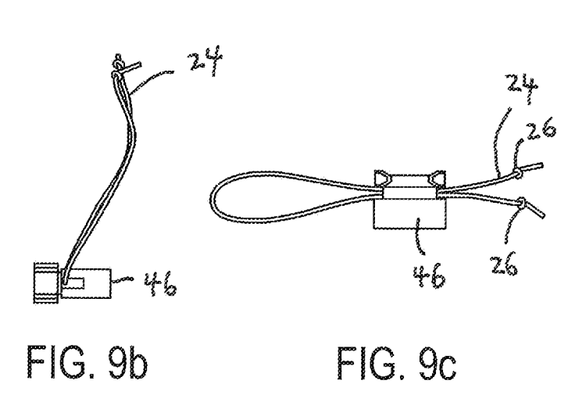
FIG. 9b is a top plan view of one end of the level where the elastic cord passes through the contoured shape end.
FIG. 9c is another view of the cord and contoured end combination shown in FIG. 9b.

FIG. 9b is a top plan view of one end of the level where the elastic cord 24 passes through the contoured shape endcap 46. FIG. 9c is another view of the cord and contoured end combination shown in FIG. 9b. In this embodiment, the cord 24 is a single strand with knots 26 tied at each free end. The cord may alternatively be one continuous loop.

Figure 9D:
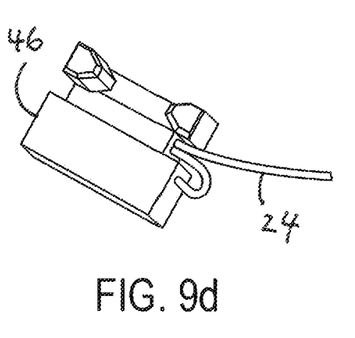
FIG. 9d depicts how the elastic cord may be threaded through the contoured end.
Figure 9E:
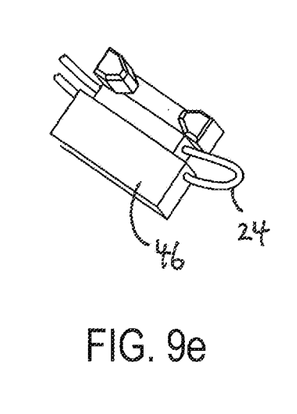
FIG. 9e depicts how the elastic cord may be threaded through the contoured end.
Figure 9F:
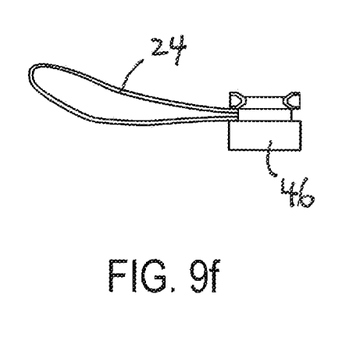
FIG. 9f provides another view of the elastic cord attached to a contoured end.

FIG. 9d depicts how the elastic cord may be threaded through the contoured end. FIG. 9e depicts how the elastic cord may alternatively be threaded through the contoured end. FIG. 9f provides another view of the elastic cord attached to a contoured end.

Figure 9G:
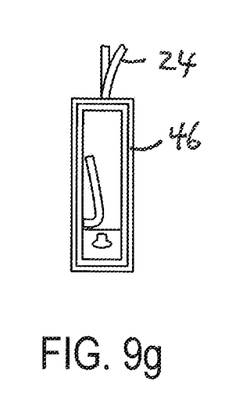
FIG. 9g shows the interior of a hollow contoured end that can hold the cord therein when not in use.
Figure 9H:
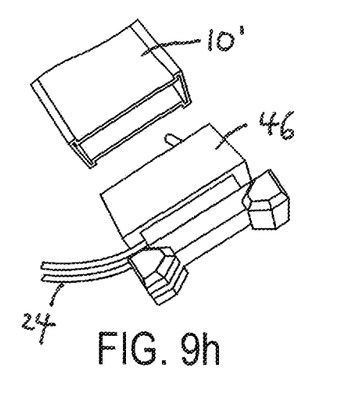
FIG. 9h shows an embodiment where a portion of the body is hollow and the contoured end plugs into the hollow body.

FIG. 9g shows the interior of a hollow contoured end. The endcap 46 or level body 10' may be hollow for storing and transporting the cord 24 when not needed. FIG. 9h shows where a portion of the level body 10' is hollow and the contoured endcap 46 plugs therein.

Figure 10A:
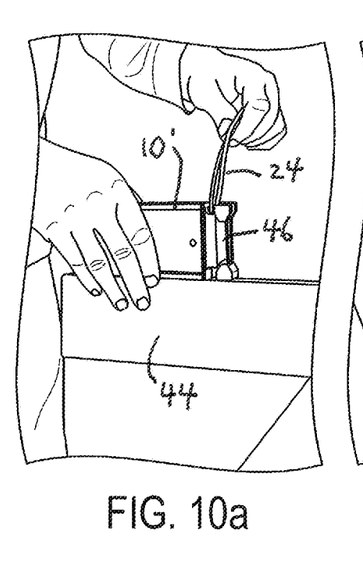
FIG. 10a shows the user holding the level in place with his right hand while holding the cord with his left hand.

FIGS. 10a-d depict how to attach the alternative embodiment level 10' to a horizontal plank 44. Detailed features of the level are omitted from these drawings for the sake of clarity. FIG. 10a shows the user holding the level 10' in place with his right hand while holding the cord 24 with his left hand. The flat bottom surface of the level 10' sits flush against the flat top surface of the plank 44.

Figure 10B:
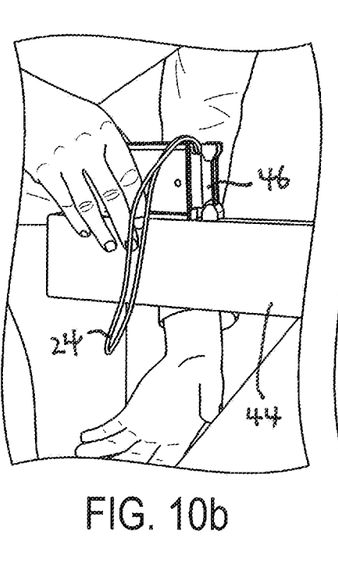
FIG. 10b shows the user dangling the elastic cord to one side of the plank while still holding the level in place.
Figure 10C:
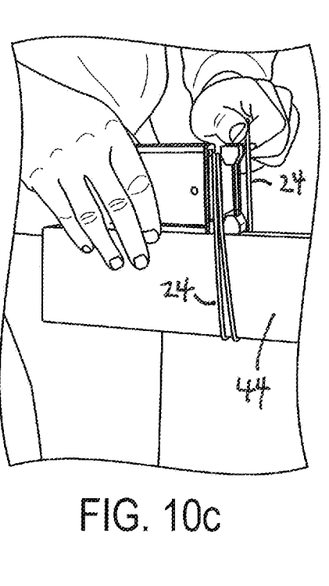
FIG. 10c shows the user stretching and wrapping the elastic cord around the plank.

FIG. 10b shows the user dangling the elastic cord 24 to one side of the plank 44 while still holding the level 10' in place. FIG. 10c shows the user stretching and wrapping the elastic cord 24 around the plank 44.

Figure 10D:
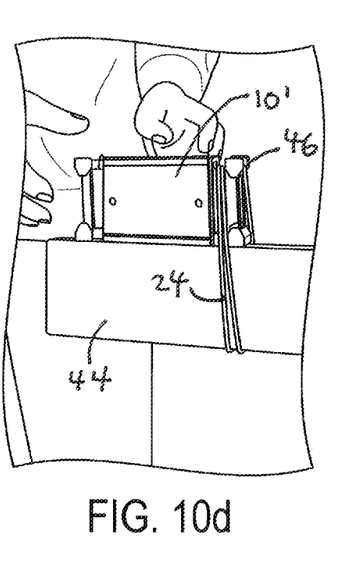
FIG. 10d shows the user continually stretching the elastic cord and hooking the loop to the contoured end thus holding the level in place, then releasing his right-hand grip on the level.

FIG. 10d shows the user continually stretching the elastic cord and hooking the loop to the contoured endcap 46 thus holding the level 10' in place, then releasing his right-hand grip on the level 10'. The level 10' is illustrated much shorter in length and without other structures for the sake of clarity.

While the particular preferred embodiments of the invention have been illustrated and described, it will be apparent that various modifications can be made without departing from the spirit and scope of the invention. It is contemplated that elements from one embodiment may be combined or substituted with elements from another embodiment.

What is claimed is:

1. An angular tilt measurement level for use with a workpiece, comprising:
   a linear bar-shaped body having an elongated length, a height, and a narrow width, the body further having a first end, a second end, and a flat bottom measurement surface;
   a first cord retention means formed from a portion of the body;
   an opening in the body;
   a level sensing means disposed within the opening;
   an elastic, flexible cord connected to the body, wherein the cord is stretch-wrapped around the first cord retention means for storage, and removable from storage when in use; and
   a second cord retention means disposed on the body for holding the stretched cord wrapped around the workpiece during level measurement.

2. The measurement level of claim 1, wherein the first cord retention means includes at least one of a groove, a contour, a notch, a boss, a ridge, a hole, a recess, and a hook.

3. The measurement level of claim 1, wherein the second cord retention means includes at least one of a groove, a contour, a notch, a boss, a ridge, a hole, a recess, and a hook.

4. The measurement level of claim 1, wherein the cord includes a knot, and when connected to the body forms a closed loop.

5. The measurement level of claim 1, wherein the body includes an open recess for storage of the cord.

6. The measurement level of claim 1, wherein the body includes a removable plate and the cord is attached to the plate.

7. The measurement level of claim 1, wherein the cord passes through the first end of the body.

8. The measurement level of claim 1, wherein the cord includes a single strand terminating with at least one knot.

9. The measurement level of claim 1, wherein the body is at least partially hollow.

10. An angular tilt measurement level for use with a pipe, plank or workpiece, comprising:
    a linear bar-shaped body having an elongated length, a height, and a width, wherein the body length includes a first end, a second end, and a flat bottom measurement surface;

a cord retention means disposed at the at least one of the first end, the second end, and proximate the flat bottom;

a removable plate disposed on the body;

an opening in the body;

a level sensing means disposed within the opening;

an elastic, flexible cord attached to the removable plate, wherein the cord is stretch-wrapped around the cord retention means for storage, and removable from storage when in use; and a hook disposed on the body for snaring the cord during level measurement when the cord is stretch-wrapped around the pipe, plank or workpiece.

11. The measurement level of claim 10, wherein the elastic cord includes a cord selected from the group consisting of a bungee cord, a rubber band, or an elastic strap.

12. The measurement level of claim 10, wherein the removable plate is joined to the body with a fastener, and the cord is tied to the removable plate.

13. The measurement level of claim 10, wherein the cord includes at least one knot.

14. The measurement level of claim 10, wherein the first end of the body includes the cord retention means.

15. The measurement level of claim 10, wherein the bottom measurement surface includes a magnet.

16. An angular tilt measurement level attachable to a workpiece, comprising:

a linear bar-shaped body having a rectangular cross-section and defined by a length, a height, and a width, the body further having a first end, a second end, and a flat bottom measurement surface;

a first cord retention means formed from a portion of the body;

an opening in the body;

a level sensing means disposed within the opening;

an elastic, flexible cord connected to the body, wherein the cord is disposed on the first cord retention means for storage, and removable from storage when in use; and a second cord retention means disposed on the body for holding the cord while stretched-wrapped around the workpiece during level measurement.

17. The measurement level of claim 16, wherein the cord retention means is formed into at least one of the first end, the second end, and the bottom surface.

18. The measurement level of claim 16, wherein the body includes a partially hollow interior.

19. The measurement level of claim 16, wherein the flat bottom measurement surface includes a V-notch.

20. The measurement level of claim 16, wherein the body includes a removable plate and the cord is attached to the removable plate.

* * * * *